July 29, 1969     R. E. CLARRIDGE     3,458,821

VARIABLE GAIN CONTROLLER

Filed July 5, 1966

INVENTOR.
RALPH E. CLARRIDGE

ATTORNEY 3,458,821
VARIABLE GAIN CONTROLLER
Ralph E. Clarridge, Huntsville, Ala., assignor to International Business Machines Corporation, Armonk, N.Y., a corporation of New York
Filed July 5, 1966, Ser. No. 562,750
Int. Cl. H03k 5/00; H03b 3/04; G06g 7/12
U.S. Cl. 328—1     10 Claims

ABSTRACT OF THE DISCLOSURE

Process controller for adjusting an actuator to correct deviations from a desired value, or set point. Provision is made for adjusting the gain of the controller in direct proportion to the error signal and inversely as the rate of change of the controlled variable.

---

This invention relates generally to control systems and particularly to those which adapt themselves to changing conditions in the system under control.

The gain adjustment of process controllers represents a compromise between system stability and rapid response to changes in the controlled system. A deviation of a controlled variable from a desired value, or set point, produces an error signal to the controller. If the controller gain is set to a high position, a small error will induce a large corrective action in a direction to restore the variable to the desired value. If the gain is set too high, the corrective action will be excessive and the variable may go beyond the desired value and cause the system to oscillate.

As an alternative, the controller gain may be set to a low position. If this is done, the control action will be sluggish and ineffective. In addition, the variable will not be held close enough to the desired value under different load conditions. Therefore, the controller gain is normally set at a compromise value in which the control action is such that oscillations caused by control action tend to decay reasonably rapidly under all load conditions. Even this type of tuning, where the controller gain remains constant, is not satisfactory on many applications since the maximum controller gain is limited to the value which provides stable operation over the entire range of the process.

Of course, if the operator is available to readjust the controller gain each time the process changes, the foregoing problem can be eliminated. In the usual case the operator does not have sufficient time for such adjustments and the compromise setting must be accepted.

Many processes and sensors which provide the input signals representing the value of the controlled variable are non-linear. In addition, the device which governs the admission of the controlling media, such as steam or water, is often non-linear. Therefore, the gain setting which is satisfactory for one load condition is often unsatisfactory for another. One solution to this problem is to make the gain adjustment a function of the position of the valve or other device under control and therefore also a function of the load. As the valve reaches a point where the system may become unstable, controller gain may be reduced by means of a cam or follower arrangement. The obvious shortcoming in this system is the special tailoring required for each separate loop.

A large number of control problems require the use of a dual mode controller having both proportional and integral response. In such a controller, the control action is proportional to the error signal in the first instance, and additionally, to the time integral of the error signal. In such controllers, the integral term operates to increase the overall gain of the controller for very low frequency disturbances. Deviation of the signal representing the integral term is commonly accomplished by means of a high impedance integrating circuit including a capacitor. The environmental and other shortcomings of high impedance circuits are well known. The additional expense of the capacitor is a further disadvantage of this approach.

It is therefore an object of the invention to provide an improved controller.

It is another object of the invention to provide an adaptive controller.

Still another object of the invention is to provide a controller having an adaptive gain control.

A further object of the invention is to provide a two mode controller having a substitute for the integral channel.

In this invention, controller gain is continuously adjusted according to an evaluation of the difference between the set point and the variable under control. The evaluation of the error signal and its rate of change provides a gain control signal which operates to increase gain according to the amplitude of the error signal and decrease gain according to rate of change of the error signal.

To achieve an adjustment of controller gain directly as the amplitude of the error signal and inversely as the rate of change of the error signal, an approximation is used. The rate of change of the error signal may be determined by an analysis of either the controlled variable signal or the error signal. A high pass filter, which blocks the low frequency components of the signal and passes the higher frequency components, is used to extract a frequency-sensitive, or rate signal, from the process variable signal. The rate signal is compared to the error signal. The controller gain is then adjusted as a result of the comparison.

The foregoing and other objects, features and advantages of the invention will be apparent from the following more particular description of preferred embodiments of the invention, as illustrated in the accompanying drawings.

In a dual mode controller according to this invention, no integral gain channel is required. Instead, the proportional gain is continuously adjusted to provide the equivalent of reset and integral action without introducing instabiilty. The manipulation of proportional gain follows the equation $$G = K\left(1 + R\left|\frac{(x-x_0)}{\frac{dx}{dt}}\right|\right)$$

where:

G is the gain of the controller;
K is manual adjustment of the minimum gain;
R is the reset rate, (repeats per minute);
x is the controller variable signal;
$x_0$ is the set point;
$dx/dt$ is the rate of change of the controlled variable;
$(x-x_0)$ is the error signal.

From this relationship it can be seen that the gain of the controller will vary directly as the magnitude of the error signal and inversely as the rate of change of the controlled variable. In practical operation, this relationship is not unlike the more conventional proportional plus reset. The equivalence of the proportional action is easily seen. In the case of integral action, the relationship is not obvious.

It has been mentioned that integral action may be considered as an increase in gain at very low frequencies only, thus avoiding the problem of instability. In a conventional controller the integral channel operates at a high gain on very slowly changing signals, but contributes no gain at all for rapidly varying signals. In this invention the overall controller gain is high at D.C. or low frequency, and drops off to a lower value as the rate of change of the controlled variable increases.

The system of this invention provides a response which resembles the overall frequency response of the proportional plus reset controller. However, instead of providing high gain at low frequencies by means of an integral channel, the desired characteristic is obtained by decreasing gain at high frequencies. For example, a high proportional gain setting is selected which gives the desired low frequency response. This provides the desired small offset with different loads on the system, but would normally introduce instabilities into the system. This problem is eliminated in the system of this invention by sampling the process variable signal for frequencies which, if allowed to operate on the controller, would introduce instabilities. If these frequencies are present in the variable signal, the gain of the controller is suitably reduced. In general, the higher the frequency of the variable signal, the lower the gain which will hold the system stable.

The overall control action of the system is quite similar to that of the conventional proportional plus reset controller despite the fact that there is no "integral channel" or "integral action" during those periods where the process variable signal includes a high frequency component.

Figure 1:
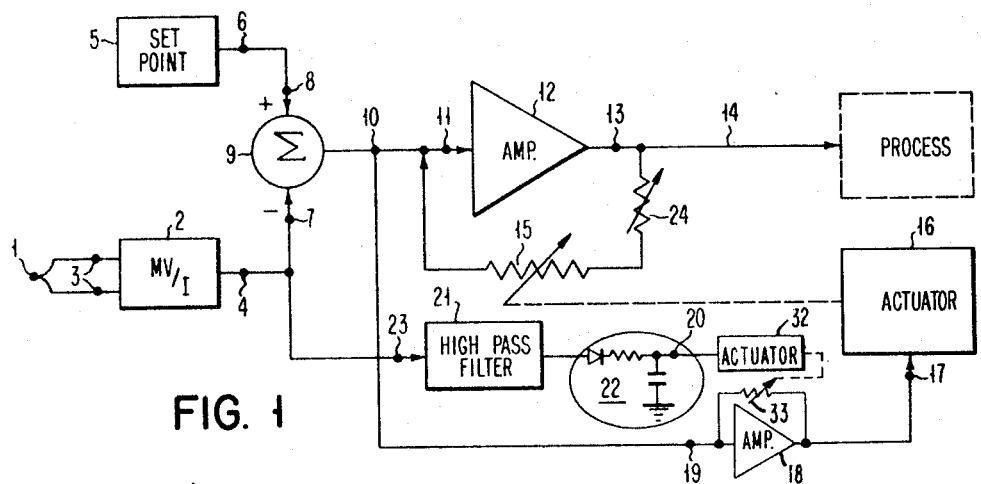
FIGURE 1 is a schematic drawing of one embodiment of the invention.

An embodiment of this invention is shown in FIGURE 1. A transducer 1, such as a thermocouple, generates a signal representing the value of the controlled variable. Transmitter 2 has input terminals 3 energized by the signal from transducer 1. The value of the controlled variable is represented by the high level 4–20 ma. output signal, or equivalent, at output terminal 4.

A set point station 5 having an output terminal 6, provides a 4–20 ma., or equivalent, output signal which represents the desired value of the controlled variable.

The signal representing the controlled variable and the signal representing the set point are applied to first input 7 and second input 8, respectively, of summing means 9. Output terminal 10 of summing means 9 provides a signal representing the deviation of the controlled variable from the desired value. The deviation, or error signal, is applied to input terminal 11 of controller amplifier 12. The output signal from amplifier 12 appears at terminal 13 from which a lead 14 conveys it to an actuator and valve or like device in the process being controlled.

The gain of amplifier 12 is adjusted by manipulating the value of feedback resistor 15. Increasing the value of resistor 15 increases the gain of amplifier 12, and decreasing the value of resistor 15 decreases the gain. Actuator 16 is operative to control the value of feedback resistor 15 in direct proportion to the signal applied to terminal 17. This signal is proportional to the term G in the equation previously described.

Actuator 16 may be any suitable actuator capable of providing the mechanical action necessary to vary the value of feedback resistor 15. Where high speed response is not required, actuator 16 and resistor 15 could take the form of a servo-driven potentiometer. Another satisfactory form would be a radiation-sensitive resistance such as a photoconductor for feedback resistor 15 and a radiation source such as a light bulb for actuator 16. In this case it would be necessary to invert the signal applied to input terminal 17.

A wide variety of devices are acceptable for the combination of resistor 15 and actuator 16, the choice being made according to cost, required speed of response and other such considerations.

Generation of the gain control signal at terminal 17 is accomplished by means of a signal comparison means such as amplifier 18, having first and second input terminals 19 and 20 to a control network 32–33 for the amplifier.

First input terminal 19 is connected to output terminal 10 of summing means 9. Amplifier 18 operates to provide an output signal at terminal 17 which varies in direct proportion to the error signal $(x-x_0)$ at first input terminal 19. The output signal at terminal 17 is further responsive to, and varies inversely with, the signal at second input terminal 20. Putting it another way, amplifier 18 operates in a similar manner to that of amplifier 12 in that the signal at terminal 20 operates actuator 32 to control the value of feedback resistor 33 in inverse (rather than direct) proportion to the signal supplied to terminal 20. Hence, the actuator 32 causes the amplifier 18 to provide an output signal at terminal 17 which is directly proportional to the input at terminal 19 and inversely proportional to the input at terminal 20. This being the case, the requirement for a gain signal representing the relationship $$R \frac{(x-x_0)}{\frac{dx}{dt}}$$

can be satisfied by applying a signal representing $dx/dt$ to second input terminal 20.

In some applications the nature of the controlled system is such that the signal representative of $dx/dt$ will be readily available and may be applied directly to terminal 20. In most situations this is not the case and some means for deriving the representation of $dx/dt$ must be provided. While the derivation of a signal which exactly represents $dx/dt$ is rather difficult and frequently requires complex circuitry, it has been found that a simple circuit provides a satisfactory approximation.

The use of high pass filter 21 and rectifier-integrator 22 between the controlled variable signal at terminal 4 and second input 20, results in a control signal at second input 20 which is representative of the high frequency components in the signal from the controlled variable. The relationship between the rectified and integrated high frequency components and the rate of change of the controlled variable $dx/dt$ is not exact, but it has been found that the use of the approximation provides good control action. The action of integrator 22 is not to be confused with the integrator used in conventional controllers. The integrator has a short time constant and is easily constructed from small inexpensive components. It can be seen that high pass filter 21 and integrator 22 operate to determine the energy content of the controlled variable signal within the band pass of the filter. Since a rapidly varying signal from the controlled variable will have substantial energy in the range of frequencies passed by the filter, the signal at input terminal 20 will be large. The time constant of integrator 22 will be quite short, serving only to provide a smoothed signal to input terminal 20. The actual value of $dx/dt$ would also be large in this case.

The gain control signal also requires the introduction of R, commonly termed the reset rate in repeats per minute. This term is represented in the relationship of the actuator gain in response to the signal at terminal 17, the gain of differential amplifier 18 and the change in resistance 15 in response to the output of actuator 16.

If desired, input terminal 23 of high pass filter 21 may be removed from terminal 4 and connected to the output of summing means 9 at terminal 10. Connection at this point allows the controller to modify the abrupt nature of a change in the position of set point 5. A manual adjustment of set point 5 produces a high frequency signal at terminal 10 which would pass through filter 21 to momentarily reduce the gain of amplifier 12 and allow the system to respond to the set point change in a more gradual fashion.

The complete derivation of the gain control signal requires an additional term K which represents a minimum gain setting when the other term approaches zero. This may be introduced by the potentiometer 24 connected in series with the feedback resistor 15. Another satisfactory way of establishing a minimum gain value includes mechanical stops on actuator 17 which limit the value of resistance 15 at the low end.

Figures 2, 4:
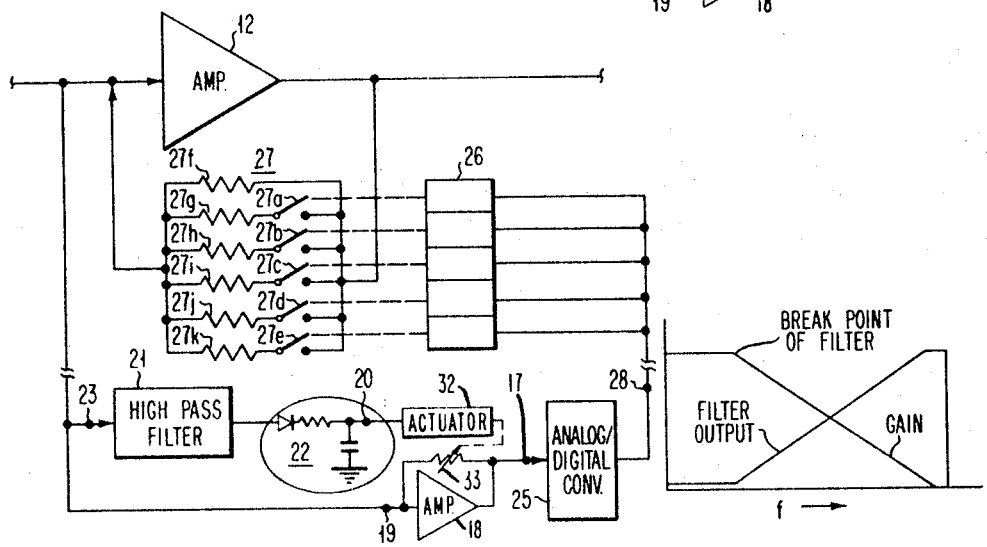
FIGURE 2 is a schematic drawing of a portion of another embodiment.
FIGURE 4 is a graph illustrating the variation of gain with the rate of change of the controlled variable signal.

In the system of FIGURE 2, high pass filter 21, integrator 22 and amplifier 18 function in the same manner as in the system of FIGURE 1; however, the functions of actuator 16 and variable resistor 15 are performed by analog to digital converter 25, digital actuator 26 and resistor network 27. In this embodiment the 4-20 ma. output signal from amplifier 18 is converted to digital form by analog to digital converter 25. The signals at output terminal 28 of analog to digital converter 25 may be in any satisfactory digital code. Digital actuator 26 operates in response to the signals at output terminal 28 to open or close selected switches 27a–27e in series with individual resistors 27g–27k of resistor network 27. The actuator 26 operates to open and close the selected switches 27a–27e to provide a high value of feedback resistance for large digital outputs and low values of feedback resistance for low digital outputs. A resistor 27f may be permanently connected in the feedback circuit to establish a minimum gain value.

Figure 3:
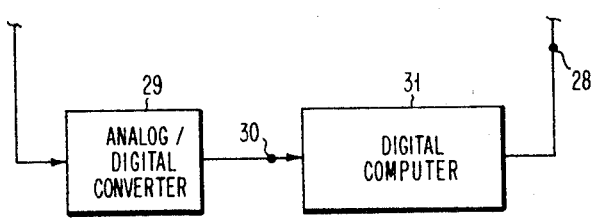
FIGURE 3 is a schematic drawing of a modification to the embodiment of FIGURE 2.

While the embodiments of FIGURES 1 and 2 utilize analog circuits for the analysis of the error signal as to magnitude and frequency, this analysis may also be performed by suitable digital means. In the system of FIGURE 3, an analog to digital converter 29 provides a digital value at terminal 30 which represents the analog error signal. This digital value is then evaluated by computer 31 for magnitude, and, in combination with readings taken previously, the computer may then evaluate the term $dx/dt$. The derivation of the gain control signal G according to the previously discussed equation is accomplished by straightforward digital computations. When these computations are complete, appropriate signals are supplied to digital actuator 26 for generation of the desired feedback resistance.

FIGURE 4 illustrates the relationship between the filter characteristic and the gain of amplifier 12. For signals having essentially no components above the break point of the filter, gain is not reduced by the operation of differential amplifier 18 and will remain at a value established by the signal at input 19. As the signal applied to filter 21 contains increasing high frequency energy, the output from the filter 21 and integrator 22 increases to cause a corresponding reduction in gain of amplifier 12.

In some controlled systems, the random higher frequency noise which exists in the signal from the controlled variable may be such as to require filter 21 to have an upper limit on the pass band as shown in FIGURE 4.

While the invention has been particularly shown and described with reference to preferred embodiments thereof, it will be understood by those skilled in the art that the foregoing and other changes in form and details may be made therein without departing from the spirit and scope of the invention.

What is claimed is:
1. In a process controller:
an amplifier having an adjustable gain control,
set point signal generating means;
process variable signal generating means;
summing means connected to said set point and process variable signal generating means for developing an error signal representing the deviation of the process variable signal from the set point signal;
means connecting the output of said summing means to the input of said amplifier;
means, connected to be energized by the output of said summing means and the output of said process variable signal generating means, for deriving an output signal which varies in direct proportion to the magnitude of said error signal and in inverse proportion to the rate of change of said process variable signal,
actuator means for said gain control; and
means connecting said actuator means to be energized by said output signal whereby the gain of said amplifier varies in direct proportion to the error signal and in inverse proportion to the rate of change of the process variable signal.

2. In a process controller:
an amplifier;
means for applying an error signal to the input of said amplifier,
signal comparison means having first and second inputs and providing an output signal directly proportional to the signal applied to said first input and inversely proportional to the signal applied to said second input;
means for applying said error signal to said first input;
a high pass filter;
means connecting said filter to transmit the high frequency portion of said error signal to said second input;
an adjustable gain control for said amplifier;
actuator means for said gain control; and
means connecting said actuator means to be energized by said output signal whereby the gain of said amplifier varies directly as the error signal and inversely as the rate of change of said error signal.

3. A device according to claim 2 wherein the means for applying an error signal input to said amplifier includes:
set point signal generating means;
process variable signal generating means, and
summing means connected to said set point and process variable signal generating means for developing an error signal representing the deviation of the process variable signal from the set point signal.

4. In a process controller:
summing means for deriving an error signal proportional to the difference between a set point and a variable signal;
a variable gain amplifier connected to said summing means for operating on said error signal;
an adjustable gain control for said amplifier;
first means, including filter means, for deriving a control signal responsive to the frequency of said variable signal;
signal comparison means having first and second input terminals, energized by said control signal and said error signal respectively, and an output terminal providing a gain control signal which varies in inverse proportion to said control signal and in direct proportion to said error signal;
actuator means for said gain control; and
means connecting the input of said actuator means to the output of said signal comparison means to be responsive to said gain control signal to vary said amplifier gain directly as the amplitude of said error signal and inversely as the frequency of said error signal.

5. A process controller comprising:
summing means having inputs energized by a first signal representing a set point and a second signal representing a process variable for deriving an output signal representing the error between said set point and process variable signals;

a variable gain amplifier having an input connected to the output of said summing means for operating on said error signal;

an adjustable gain control for said amplifier;

comparison means, energized by said error signal, and including filter means energized by said process variable signal, for deriving a gain control signal responsive to the frequency of said process variable signal and to said error signal;

actuator means for said gain control; and means connecting said gain control signal to said actuator means to vary said amplifier gain directly as the amplitude of said error signal and inversely as the frequency of said error signal.

6. In a process controller:

an amplifier;

set point signal generating means;

process variable signal generating means;

summing means connected to said set point and process variable signal generating means for developing an output signal representing the deviation of the process variable signal from the set point signal;

means connecting the output of said summing means to the input of said amplifier;

signal comparison means saving first and second inputs and providing an output signal variable in direct proportion to the signal applied to said first input and variable in inverse proportion to the signal applied to said second input;

means connecting the output of said summing means to said first input of said signal comparison means;

high pass filter means connecting the output of said process variable signal generating means to transmit the high frequency portion of said process variable signal to said second input of said signal comparison means;

an adjustable gain control for said amplifier;

actuator means for said gain control; and means connecting said actuator means to be energized by the output signal of signal comparison means whereby the gain of said amplifier varies in direct proportion to the error signal and inverse proportion to the rate of change of the process variable signal.

7. An adaptive controller comprising:

means for generating a set point signal representing the desired value of a variable;

means for generating a variable signal representing the measured value of a variable;

summing means connected to said set point and process variable signal generating means for developing an error signal representing the difference between said set point signal and said variable signal;

amplifier means having an input terminal, connected to said summing means to be energized by said error signal, an adjustable gain control and an output terminal;

signal comparison means having first and second inputs and providing an output signal which varies directly as the signal applied to said first input and inversely as the signal applied to said second input;

means connecting the first input of said comparison means to said summing means to be energized by said error signal;

high pass filter means having input and output terminals;

means connecting said filter input terminals to the output of said summing means to be energized by said error signal;

means connecting said filter output terminals to said second input of said comparison means;

means connecting the output of said comparison means to said adjustable gain control to increase the gain of said amplifier in response to an increase in said error signal and to decrease the gain of said amplifier in response to an increase in the output of said high pass filter.

8. A device according to claim 7 wherein said means connecting said filter output terminals to said second input of said comparator means comprises:

a rectifier means for converting the output of said filter to a D.C. signal; and means for connecting said D.C. signal to said second input of said comparator means.

9. An adaptive controller comprising:

means for generating a set point signal representing the desired value of a variable;

means for generating a variable signal representing the actual value of a variable;

summing means connected to said set point and process variable signal generating means for developing an error signal representing the difference between said set point signal and said variable signal;

amplifier means having an input terminal, connected to said summing means to be energized by said error signal, an adjustable gain control and an output terminal;

signal comparison means having first and second inputs and providing an output signal which varies directly as the signal applied to said first input and inversely as the signal applied to said second input;

means connecting the first input of said comparison means to said summing means to be energized by said error signal;

high pass filter means having input and output terminals;

means connecting said filter input terminals to the output of said means for generating a variable signal to be energized by said variable signal;

means connecting said filter output terminals to said second input of said comparison means;

means connecting the output of said comparison means to said adjustable gain control to increase the gain of said amplifier in response to an increase in said error signal and to decrease the gain of said amplifier in response to an increase in the output of said high pass filter.

10. A device according to claim 9 wherein said means connecting said filter output terminals to said second input of said comparator means comprises:

a rectifier means for converting the output of said filter to a D.C. signal; and means for connecting said D.C. signal to said second input of said comparator means.

References Cited

UNITED STATES PATENTS

| | | | |
|---|---|---|---|
| 2,860,241 | 11/1958 | Post | 250—27 |
| 2,896,095 | 7/1959 | Reed | 307—149 |
| 3,206,556 | 9/1965 | Bachman et al. | 179—100.1 |
| 3,215,824 | 11/1965 | Alexander et al. | 235—193 |
| 3,237,107 | 2/1966 | Bresenoff et al. | 328—1 |
| 3,301,510 | 1/1967 | Cook | 244—77 |

ARTHUR GAUSS, Primary Examiner

R. C. WOODBRIDGE, Assistant Examiner

U.S. Cl. X.R.

307—229; 328—132, 135, 161; 330—85, 99